United States Patent [19]

Fisher et al.

[11] 4,329,917
[45] May 18, 1982

[54] VENTILATORS AND/OR WINDOWS FOR VEHICLES

[75] Inventors: Sidney E. Fisher, Birmingham; Keith R. Hunt, Devon, both of England

[73] Assignee: Britax Weathershields Limited, Birmingham, England

[21] Appl. No.: 114,427

[22] Filed: Jan. 22, 1980

[30] Foreign Application Priority Data

Jan. 23, 1979 [GB] United Kingdom ................. 7902429
Jun. 20, 1979 [GB] United Kingdom ................. 7921531

[51] Int. Cl.$^3$ .............................................. B60H 1/26
[52] U.S. Cl. ...................................... 98/2.14; 16/337; 296/216; 49/219
[58] Field of Search ................. 98/2.14; 296/216, 224; 49/219; 16/140, 141, 142, 144, 145

[56] References Cited

U.S. PATENT DOCUMENTS 2,210,592  8/1940  Lintern et al. ....................... 98/2.14
2,587,781  3/1952  Stanfield et al. .................. 16/141 X

FOREIGN PATENT DOCUMENTS 2002493  11/1977  Fed. Rep. of Germany ....... 98/2.14
525786   9/1972   Switzerland .
1166200  10/1969  United Kingdom .
1397251  6/1975   United Kingdom ................. 98/2.14
1430087  3/1976   United Kingdom ................. 98/2.14

*Primary Examiner*—Albert J. Makay
*Assistant Examiner*—Harold Joyce
*Attorney, Agent, or Firm*—Young & Thompson

[57] ABSTRACT

In a combined ventilator and window for installation in the roof of a motor coach, a panel 18 is mounted on angularly movable arms 28 so that the panel 18 can be moved between a closed position, opened positions in which either side of the panel 18 or either end of the panel 18 is opened, and an open position in which the panel 18 is parallel to and spaced from its closed position. The arms 28 are pivotally mounted on the frame 10 at 38 and have detent means 36, 40 to hold them in their alternative positions. The other ends of the arms 28 are pivotally connected to brackets 46, 74 depending from the panel, the latter pivotal connections being adapted to permit relative movement between the arms 28 and the panel 18 additional to movement about the respective axes of pivotal coupling.

4 Claims, 5 Drawing Figures

VENTILATORS AND/OR WINDOWS FOR VEHICLES

This invention relates to ventilators and/or windows of the kind comprising a panel supported at each of two opposite ends on a frame bounding an opening in a vehicle roof by a respective pair of support arms, each support arm being pivotally connected at one end to the frame and at the other end to the panel and being provided with spring-loaded detent means for holding said arm in an one of a plurality of angularly-spaced positions. The panel is thus movable between a closed position, pivotally inclined opened positions in which the ventilator and/or window is opened along one side while being closed along the opposite side, and a fully-open position parallel to and spaced from the closed position.

In some known ventilators and/or windows of the foregoing kind, the support arms comprise telescopic struts of which parts are capable of both axial and angular movement to permit the panel to move relative to the frame into the various positions. In such known circumstance, the struts may be spring-loaded towards the closed position or at least embody anti-rattle springs acting between the relatively movable parts. Ventilators of this type are described in U.K. Specifications Nos. 1,166,200 and 1,397,251. In each of these ventilators, the springs in the struts are compression springs and one end of the spring in each strut abuts against a transverse pin which projects through slots in the strut and serves as a detent to engage with formations on a member fast with the frame to retain the corresponding strut in any one of a plurality of angularly spaced positions. Such assemblies are relatively cumbersome because the struts are necessarily of substantial length.

According to the present invention, the need to provide telescopic struts is avoided by adapting the pivotal connection at the end opposite to the detent means of at least one arm of each pair to permit relative movement between said arm and said panel additional to movement about the axis of said pivotal connection.

According to a preferred feature of the invention, the pivotal connection at the end opposite to the detent means of one arm of each pair is adapted to permit relative linear movement between the arm and the panel having a component in a direction parallel to the side of the panel to which such pair of arms is connected. This enables the arms of each pair to be mounted facing in opposite directions to one another and also permits one end of the panel, joining the two sides to which the respective pairs of arms are attached, to be raised without raising the other.

According to another preferred feature of the invention, the pivotal connection at the end opposite to the detent means of each of the four arms is adapted to permit relative arcuate movement about axes perpendicular to the respective axis of such pivotal connection. This allows the side of the panel to which one of the pairs of arms is attached to be raised to a different extent from the opposite side of the panel.

An embodiment of the invention, incorporating both of the foregoing preferred features, will now be described by way of example with reference to the accompanying drawings in which.

Figure 1:
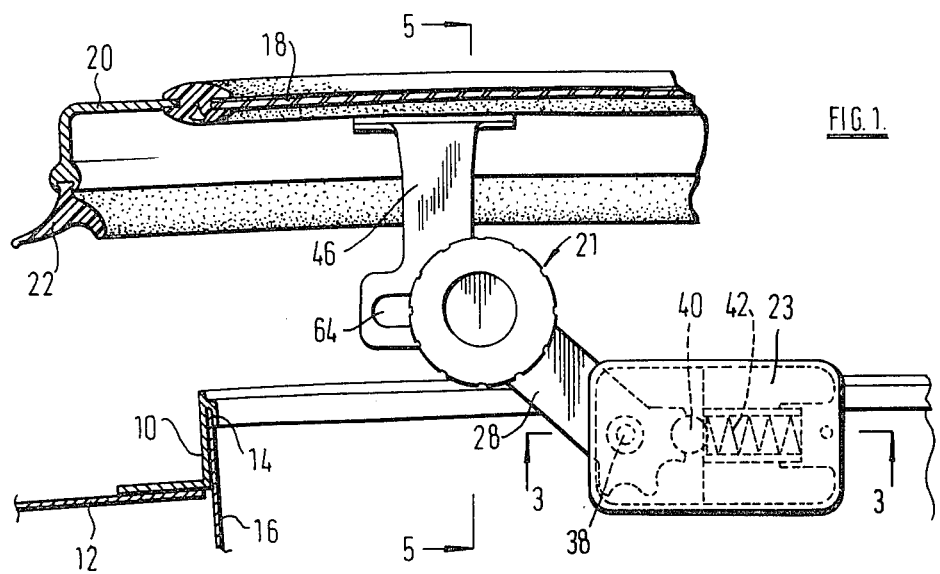
FIG. 1 is a vertical cross-sectional view of a part at one end of a ventilator and window in accordance with the invention showing the panel thereof in its fully-opened position.

The combined ventilator and window illustrated in the drawings is suitable for use in the roof of a motor coach or caravan. The ventilator and window comprises a water-check frame 10 which surrounds an opening in the roof 12 of a vehicle. The frame 10 is generally 'L'-shaped in cross-section but has a formation 14 providing a groove for receiving a strip 16 of plastics material which bounds the opening in the vehicle roof and is connected by its bottom edge (not shown) to the interior roof trim of the vehicle.

A rigid panel 18, having a peripheral frame 20, is super-imposed above the water-check frame 10. The bottom edge of the frame 20 carries a rubber sealing strip 22 which engages with the vehicle roof 12 outside the water-check frame 10 when the panel is in a closed position.

The frame 20 of the panel 18 is supported from the water-check frame 10 by means of two pairs of pivotal arm assemblies which are mounted on opposite sides of the frame 10. Each pair of arm assemblies comprises a sliding arm assembly 21 (FIG. 1) and a non-sliding arm assembly 22 (FIG. 2).

Figure 2:
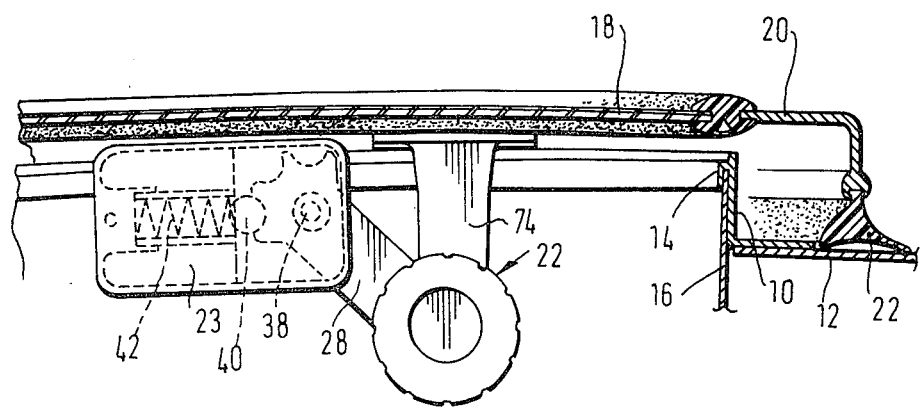
FIG. 2 is a vertical cross-sectional view of the other end of the ventilator and window shown in FIG. 1, with the panel in its fully-closed position.
Figure 3:
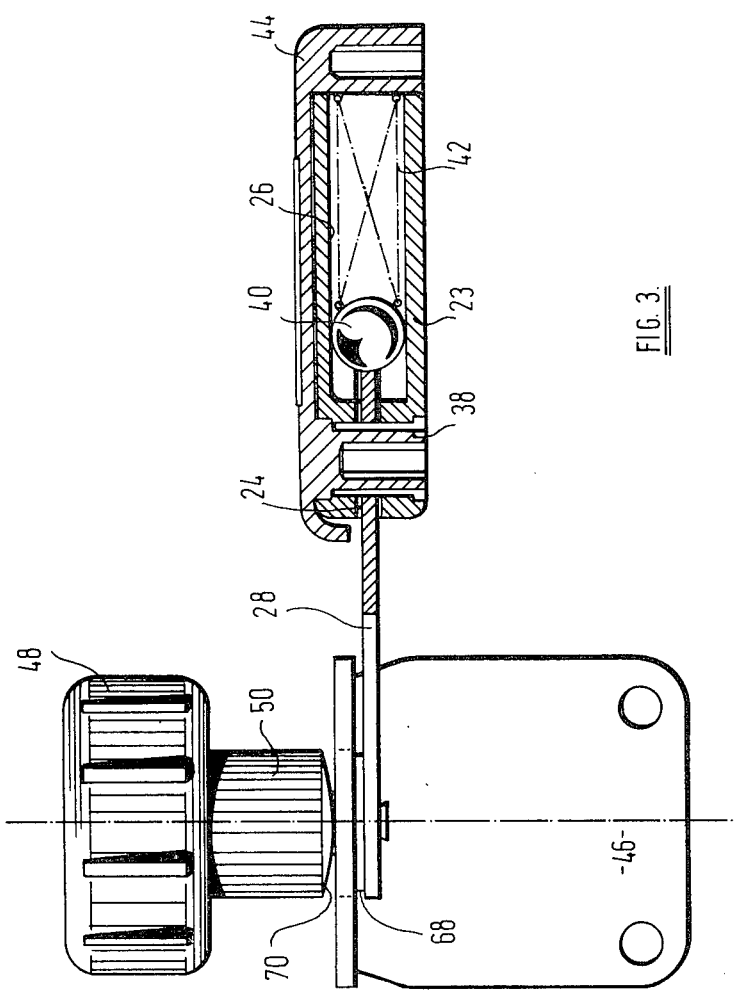
FIG. 3 is a section on the line 3—3 on FIG. 1.

Referring to FIGS. 1 and 3, the sliding arm assembly 21 comprises a block 23 of nylon or other synthetic plastics material which is secured to the water-check frame 10. The block 23 is provided at one end with an axially extending vertical slot 24 which, at its inner end, merges with the inner end of a longitudinal bore 26.

Figure 4:
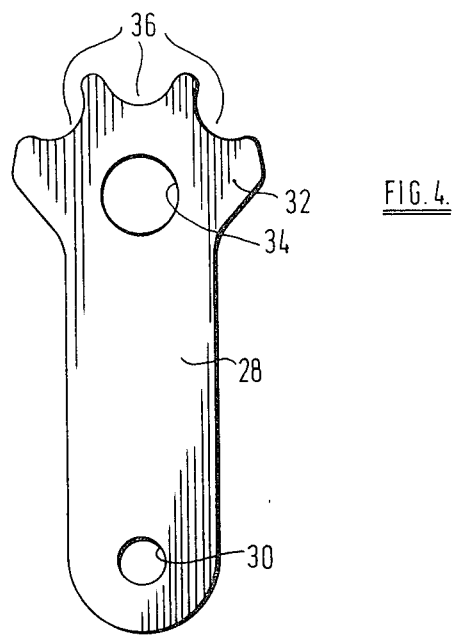
FIG. 4 is a plan view of an arm.

A rigid arm 28 has an opening 30 (FIG. 4) in one end. At the other end, it has an enlargement 32 of generally circular outline which is provided with a central opening 34 and three angularly spaced notches 36 in its edge remote from the opening 30. The arm 28 is received in the slot 24 (FIG. 3) with a pin 38 extending through the opening 30 and received at opposite ends in the block 23 on opposite sides of the slot 24 to form a pivotal axis for the arm 28.

A ball 40 is guided in the bore 26 and urged into engagement with the circular enlargement 32 by means of a compression spring 42 which is retained within the bore 26 by engagement with a cover 44 which encloses the block 23.

Figure 5:
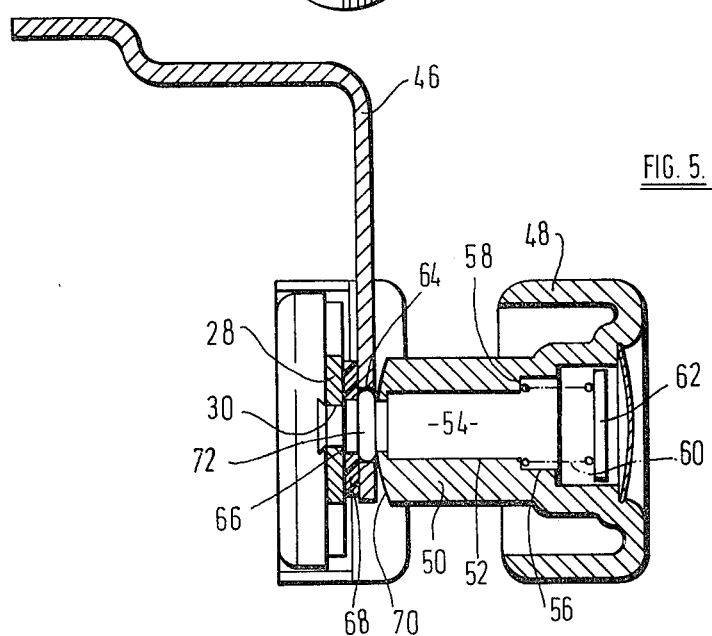
FIG. 5 is a cross-sectional view on the line 5—5 on FIG. 1.

The free end of the arm 28 is pivotally coupled to a bracket 46 which depends downwardly from the frame 20 of the panel 18. Referring particularly to FIGS. 3 and 5, the pivotal coupling comprises a circular handle 48 which is provided with an axially extending boss 50 having an axial bore 52 in which a headed pin 54 is slidably located. The bore 52 is counter-bored at 56 at the end adjacent to the handle 48 providing a shoulder 58. A compression spring 60 is accommodated within the counter-bore 11 and engages between the shoulder 58 and the head 62 of the pin 54.

The end of the pin 54 remote from the head 62 is of reduced diameter and projects from the boss 50 through a slot 64 in the arm 46 and the opening 30 in the arm 28. The free end of the pin 54 is riveted over to clamp the arm 28 against a shoulder 66 formed at the inner end of the reduced diameter end portion of the pin 54.

A washer 68 is disposed between the arm 28 and the bracket 46 which, in turn, is clamped between the washer 68 and the free end 70 of the boss 50 which has a part-spherical outline, as can best be seen in FIG. 3. The compression spring 60 therefore acts to clamp the bracket 46 between the washer 68 and the end 70 of the boss 50.

A portion 72 at that point in the length of the pin which is surrounded by the slot 64 in the bracket 46 is also of part-spherical outline. This, together with the boss 50 enables the connection to act as a universal joint so as to accommodate relative tilting movement between the arm 28 and the bracket 46 as the pin 54 slides axially in the bore 52 against the force of the spring 60. The elongate nature of the slot 64 permits relative linear movement between the arm 28 and the bracket 46 so as to accommodate the horizontal linear component of the angular movement of the arm 28 between the open and closed positions.

The portion 72 may comprise a collar which surrounds the pin 54. Such collar may be of synthetic plastics material to provide a lubrication-free joint. Alternatively, the edge of the slot 64 may be received within a channel member of plastics material to provide the lubrication-free joint, the collar being of metal or the portion 72 being integral with the pin 54.

Referring to FIG. 2, the other pivotal arm assembly of each pair is identical with that illustrated in FIG. 1 except that the bracket 46 is replaced by a bracket 74 which has a circular hole (not shown) in place of the slot 64. Thus, the joint between the arm 28 and the bracket 74 accommodates relative tilting movement but not relative linear movement therebetween.

The panel 18 can be moved manually with respect to the frame 10 between a closed position and partially-open or fully-open positions.

In the fully-open position shown in FIG. 1, the panel 18 is spaced from, and is parallel to, the frame 10 and is held in this position by engagement of the balls 40 in the uppermost notches 36 of the arms 28.

In the fully-closed position shown in FIG. 2, the arms 28 are inclined downwardly and the balls 40 are received in the lowermost of the notches 36 to retain the sealing strip 22 in positive engagement with the roof 12 of the vehicle.

The panel 18 can be opened to an intermediate position in which the balls 40 engage in the intermediate notches 36. The panel 18 can also be opened, either fully or to the intermediate position, at either end or either side while the other end or side remains closed.

When the arm 28 is moved angularly about its pin 38, the longitudinal component of movement of the free end of the arm is accommodated by the sliding movement of pin 50 in the slot 64 of that arm assembly if it is a sliding arm assembly as shown in FIG. 1, or of the other arm assembly of the pair if the arm assembly being moved is a fixed arm assembly as shown in FIG. 2. The strength of the compression springs 42 is chosen to provide each detent defined by the engagement of each ball 40 in a corresponding notch 36 with a force which is sufficient to provide positive holding force while being readily overcome by a manual force applied to the corresponding handle 48, in either an opening or closing direction.

Both the blocks 22 of a pair of arm assemblies may be combined into a single assembly or, alternatively, enclosed by a common cover.

We claim:

1. A ventilator for a vehicle comprising a frame adapted to bound an opening in a vehicle roof, a panel, two pairs of support arms, each pair supporting the panel on the frame at a respective one of two opposite ends of the frame, each support arm being pivotally connected at one end to the frame and at the other end to the panel and being provided with spring-loaded detent means at one or other of said ends for holding said arm in any one of a plurality of angularly-spaced positions, the pivotal connection at the end opposite to the detent means of each of said arms comprising a pin which projects through superimposed openings in the arm and a member to which said arm is connected, a boss in which the pin is axially movable and a spring which engages between the pin and the boss so as to clamp the member and the arm together between a formation on the pin and the adjacent end of the boss.

2. A ventilator according to claim 1, further comprising a formation of spherical outline on the part of the pin surrounded by the arm or the member, the end of the boss also having a spherical outline so that the connection is a universal joint.

3. A ventilator according to claim 2, wherein one of the surfaces of the spherical-outline formation on the pin and the abutting edge of the opening in which said formation is received is of plastics material.

4. A ventilator according to claim 1, wherein the pin has a second shoulder near the end thereof remote from its head and the arm is disposed between said second shoulder on the pin and said end of the pin, the arm being riveted to said end of the pin, and a bracket depends from the panel and surrounds the part-spherical formation on the pin, a washer being disposed between the arm and the bracket.

* * * * *